US012537828B2

(12) United States Patent
Shaw et al.

(10) Patent No.: US 12,537,828 B2
(45) Date of Patent: *Jan. 27, 2026

(54) ON-DEMAND SOFTWARE-DEFINED SECURITY SERVICE ORCHESTRATION FOR A 5G WIRELESS NETWORK

(71) Applicant: T-Mobile USA, Inc., Bellevue, WA (US)

(72) Inventors: Venson Shaw, Kirkland, WA (US); Sunil Lingayat, Issaquah, WA (US); Gaviphat Lekutai, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 32 days.

This patent is subject to a terminal disclaimer.

(21) Appl. No.: 18/473,438

(22) Filed: Sep. 25, 2023

(65) Prior Publication Data

US 2024/0015171 A1 Jan. 11, 2024

Related U.S. Application Data

(63) Continuation of application No. 16/849,066, filed on Apr. 15, 2020, now Pat. No. 11,799,878.

(51) Int. Cl.
*H04L 9/00* (2022.01)
*H04L 9/40* (2022.01)

(52) U.S. Cl.
CPC ...... *H04L 63/1416* (2013.01); *H04L 63/1425* (2013.01); *H04L 63/1433* (2013.01); *H04L 63/20* (2013.01)

(58) Field of Classification Search
CPC ............ H04L 63/1416; H04L 63/1425; H04L 63/1433
See application file for complete search history.

(56) References Cited

U.S. PATENT DOCUMENTS 7,676,841 B2   3/2010   Sobchuk et al.
8,391,834 B2   3/2013   Raleigh
(Continued)

FOREIGN PATENT DOCUMENTS

CN   101764799 B   11/2014
CN   102484783 B   11/2014
(Continued)

OTHER PUBLICATIONS

Abdurrahman, U.A. et al. "A new mobile-based multi-factor authentication scheme using pre-shared number, GPS location and time stamp." 2013 International Conference on Electronics, Computer and Computation (ICECCO). IEEE, 2013, 4 pages.
(Continued)

*Primary Examiner* — Christopher J Brown
(74) *Attorney, Agent, or Firm* — Perkins Coie LLP

(57) ABSTRACT

The disclosed embodiments include a software-defined security (SDS) service that can monitor runtime behavior of a network of nodes of a wireless network and detect anomalous activity indicating contamination of the network of nodes, where the contamination includes unauthorized instructions designed to damage or interrupt a function of the network of nodes. The SDS service can dynamically coordinate a blacklist and a whitelist, where the blacklist includes an indication of contaminated assets and the whitelist includes an indication of non-contaminated assets. The contaminated assets are isolated with a cleanroom environment, where the security resources sanitize the contaminated assets. Then, indications of the decontaminated assets are moved from the blacklist to the whitelist, and the use of the security resources are dynamically adjusted according to a load ratio between the whitelist and the blacklist.

20 Claims, 7 Drawing Sheets

(56) References Cited

U.S. PATENT DOCUMENTS

| | | | |
|---|---|---|---|
| 8,448,257 B2 | 5/2013 | Garcia et al. | |
| 8,621,553 B2 | 12/2013 | Syed et al. | |
| 8,667,148 B1 | 3/2014 | Turner | |
| 8,667,556 B2 | 3/2014 | Chang et al. | |
| 8,788,804 B2 | 7/2014 | Nagaraja | |
| 8,873,407 B2 | 10/2014 | Burbidge et al. | |
| 9,152,789 B2 | 10/2015 | Natarajan et al. | |
| 9,154,479 B1 | 10/2015 | Sethi | |
| 9,210,180 B2 | 12/2015 | Zisapel et al. | |
| 9,250,887 B2 | 2/2016 | Lucovsky et al. | |
| 9,262,127 B2 | 2/2016 | Patrick | |
| 9,363,278 B2 | 6/2016 | Maria | |
| 9,503,463 B2 | 11/2016 | Karta et al. | |
| 9,558,677 B2 | 1/2017 | Sadeh-koniecpol et al. | |
| 9,584,517 B1 | 2/2017 | Roth et al. | |
| 9,591,003 B2 | 3/2017 | Johansson et al. | |
| 9,591,556 B2 | 3/2017 | Ventimiglia et al. | |
| 9,659,251 B2 | 5/2017 | Tang et al. | |
| 9,661,009 B1 | 5/2017 | Karandikar et al. | |
| 9,680,855 B2 | 6/2017 | Schultz et al. | |
| 9,710,664 B2 | 7/2017 | Sathyadevan et al. | |
| 9,712,549 B2 | 7/2017 | Almurayh | |
| 9,742,690 B2 | 8/2017 | Parikh et al. | |
| 9,756,061 B1 | 9/2017 | Roeh et al. | |
| 9,756,601 B2* | 9/2017 | Liu | H04W 24/04 |
| 9,772,831 B2 | 9/2017 | Lucovsky et al. | |
| 9,781,205 B2 | 10/2017 | Batrouni et al. | |
| 9,825,991 B2 | 11/2017 | Ivanchykhin et al. | |
| 9,832,719 B2 | 11/2017 | Horn et al. | |
| 9,838,408 B1 | 12/2017 | Karandikar et al. | |
| 9,872,233 B2 | 1/2018 | Jeon et al. | |
| 9,930,058 B2 | 3/2018 | Carpenter et al. | |
| 9,930,061 B2 | 3/2018 | Zandani | |
| 9,954,902 B1 | 4/2018 | Sethi | |
| 10,044,719 B2 | 8/2018 | Desai et al. | |
| 10,050,989 B2 | 8/2018 | Ng et al. | |
| 10,086,782 B1 | 10/2018 | Konrardy et al. | |
| 10,193,919 B2 | 1/2019 | Chesla | |
| 10,218,725 B2 | 2/2019 | Kim | |
| 10,237,286 B2 | 3/2019 | Sharma et al. | |
| 10,306,697 B2 | 5/2019 | Wang et al. | |
| 10,320,766 B2 | 6/2019 | Chen et al. | |
| 10,348,747 B2 | 7/2019 | Yamada et al. | |
| 10,349,313 B2 | 7/2019 | Chen et al. | |
| 10,454,950 B1 | 10/2019 | Aziz | |
| 10,560,840 B2 | 2/2020 | Ghosh et al. | |
| 10,771,489 B1 | 9/2020 | Bisht et al. | |
| 10,873,594 B2 | 12/2020 | Ekambaram | |
| 10,999,776 B2 | 5/2021 | Jagannatha et al. | |
| 11,057,774 B1 | 7/2021 | Shaw et al. | |
| 11,070,982 B1 | 7/2021 | Shaw et al. | |
| 11,115,824 B1 | 9/2021 | Shaw et al. | |
| 11,206,542 B2 | 12/2021 | Shaw et al. | |
| 11,444,980 B2 | 9/2022 | Shaw et al. | |
| 11,558,747 B2 | 1/2023 | Shaw et al. | |
| 11,659,396 B2 | 5/2023 | Shaw et al. | |
| 2003/0233568 A1 | 12/2003 | Maufer et al. | |
| 2005/0066197 A1 | 3/2005 | Hirata et al. | |
| 2006/0072527 A1 | 4/2006 | Beck et al. | |
| 2006/0174342 A1 | 8/2006 | Zaheer et al. | |
| 2007/0089172 A1* | 4/2007 | Bare | G06F 21/56 726/24 |
| 2007/0274524 A1 | 11/2007 | Ksontini et al. | |
| 2007/0298720 A1 | 12/2007 | Wolman et al. | |
| 2008/0155645 A1 | 6/2008 | Hutnik et al. | |
| 2009/0307491 A1 | 12/2009 | Nakatsugawa et al. | |
| 2012/0005724 A1 | 1/2012 | Lee | |
| 2012/0191614 A1 | 7/2012 | Babitch et al. | |
| 2014/0090060 A1 | 3/2014 | Hart | |
| 2014/0181888 A1 | 6/2014 | Li et al. | |
| 2014/0241317 A1 | 8/2014 | Jamadagni et al. | |
| 2014/0259095 A1 | 9/2014 | Bryant | |
| 2015/0143490 A1 | 5/2015 | Fang | |
| 2015/0295953 A1 | 10/2015 | Chen et al. | |
| 2016/0070915 A1 | 3/2016 | Knapp | |
| 2016/0099963 A1 | 4/2016 | Mahaffey et al. | |
| 2016/0110819 A1 | 4/2016 | Abramowitz | |
| 2016/0205128 A1 | 7/2016 | Holtmanns et al. | |
| 2016/0219024 A1* | 7/2016 | Verzun | H04L 9/34 |
| 2016/0226893 A1 | 8/2016 | Warikoo et al. | |
| 2016/0262069 A1 | 9/2016 | Parsay et al. | |
| 2016/0277926 A1* | 9/2016 | Molina | H04W 12/06 |
| 2017/0070480 A1 | 3/2017 | Blumenfeld et al. | |
| 2017/0093904 A1 | 3/2017 | Ng et al. | |
| 2017/0272472 A1 | 9/2017 | Adhar | |
| 2017/0279843 A1 | 9/2017 | Schultz et al. | |
| 2017/0346846 A1 | 11/2017 | Findlay | |
| 2018/0020021 A1 | 1/2018 | Gilmore et al. | |
| 2018/0159851 A1 | 6/2018 | Ogrinz et al. | |
| 2018/0183827 A1 | 6/2018 | Zorlular et al. | |
| 2018/0262516 A1* | 9/2018 | Zomlot | H04L 63/1425 |
| 2018/0324218 A1* | 11/2018 | Xie | H04L 41/12 |
| 2018/0359274 A1 | 12/2018 | Barahona et al. | |
| 2019/0036958 A1 | 1/2019 | Shi | |
| 2019/0052664 A1 | 2/2019 | Kibler et al. | |
| 2019/0128936 A1 | 5/2019 | Brown | |
| 2019/0228110 A1 | 7/2019 | Yan et al. | |
| 2019/0260785 A1 | 8/2019 | Jenkinson et al. | |
| 2019/0306188 A1 | 10/2019 | Medvedovsky et al. | |
| 2019/0312887 A1 | 10/2019 | Grimm et al. | |
| 2019/0380037 A1 | 12/2019 | Lifshitz et al. | |
| 2020/0059976 A1 | 2/2020 | Bhatia et al. | |
| 2020/0067983 A1* | 2/2020 | Soryal | G06F 9/45558 |
| 2020/0137104 A1 | 4/2020 | Hassanzadeh et al. | |
| 2020/0162500 A1 | 5/2020 | Ciocarlie et al. | |
| 2020/0216097 A1 | 7/2020 | Galula et al. | |
| 2020/0236121 A1* | 7/2020 | Spurlock | G06F 21/566 |
| 2020/0239273 A1 | 7/2020 | Hanninen et al. | |
| 2020/0320208 A1 | 10/2020 | Bhosale et al. | |
| 2020/0328885 A1 | 10/2020 | Tola et al. | |
| 2020/0334554 A1 | 10/2020 | Takahashi et al. | |
| 2020/0374304 A1 | 11/2020 | Rodriguez Bravo et al. | |
| 2020/0412758 A1 | 12/2020 | Trivellato et al. | |
| 2020/0413264 A1 | 12/2020 | Han et al. | |
| 2021/0006574 A1 | 1/2021 | Venter et al. | |
| 2021/0044563 A1 | 2/2021 | Reyes et al. | |
| 2021/0133670 A1 | 5/2021 | Cella et al. | |
| 2021/0234666 A1 | 7/2021 | Amouyal et al. | |

FOREIGN PATENT DOCUMENTS

| | | |
|---|---|---|
| CN | 108370370 A | 8/2018 |
| CN | 104185278 B | 12/2018 |
| CN | 109548099 A | 3/2019 |
| CN | 104170469 B | 6/2019 |
| CN | 110213226 A | 9/2019 |
| EP | 2421300 B1 | 10/2014 |
| EP | 3161656 A1 | 5/2017 |
| EP | 3354063 A1 | 8/2018 |
| EP | 3358800 A1 | 8/2018 |
| EP | 3416148 A1 | 12/2018 |
| EP | 2640143 B1 | 7/2019 |
| EP | 3317804 B1 | 7/2019 |
| EP | 3287927 B1 | 11/2019 |
| JP | 2015507434 A | 3/2015 |
| JP | 2018537912 A | 12/2018 |
| JP | 2019097133 A | 6/2019 |
| JP | 6626002 B2 | 12/2019 |
| KR | 20050026624 A | 3/2005 |
| KR | 100776828 B1 | 11/2007 |
| KR | 101579021 B1 | 12/2015 |
| KR | 101681855 B1 | 12/2016 |
| KR | 20180098251 A | 9/2018 |
| KR | 20180127221 A | 11/2018 |
| KR | 102037701 B1 | 11/2019 |
| WO | 2008128040 A1 | 10/2008 |
| WO | 2009096833 A1 | 8/2009 |
| WO | 2011147462 A1 | 12/2011 |
| WO | 2012037637 A1 | 3/2012 |
| WO | 2013166126 A1 | 11/2013 |
| WO | 2016064919 A1 | 4/2016 |
| WO | 2016178605 A1 | 11/2016 |
| WO | 2017011827 A1 | 1/2017 |
| WO | 2017189176 A2 | 11/2017 |

(56) References Cited

FOREIGN PATENT DOCUMENTS

| | | |
|---|---|---|
| WO | 2018004434 A1 | 1/2018 |
| WO | 2018158643 A1 | 9/2018 |
| WO | 2019028211 A1 | 2/2019 |

OTHER PUBLICATIONS

Paulet, Russell et al. "Privacy-preserving and content-protecting location based queries." IEEE Transactions on knowledge and data engineering 26:5, May 2014, pp. 1200-1210.

* cited by examiner

ON-DEMAND SOFTWARE-DEFINED SECURITY SERVICE ORCHESTRATION FOR A 5G WIRELESS NETWORK

CROSS-REFERENCE TO RELATED APPLICATIONS

This application is a continuation of U.S. patent application Ser. No. 16/849,066, filed on Apr. 15, 2020, entitled ON-DEMAND SOFTWARE-DEFINED SECURITY SERVICE ORCHESTRATION FOR A 5G WIRELESS NETWORK, which is hereby incorporated by reference in its entirety.

BACKGROUND 5G refers to fifth generation wireless communication technologies that support cellular data networks. 3GPP defines any system using 5G New Radio (5G NR) software as 5G. The frequency spectrum of 5G is divided into millimeter wave, mid-band, and low-band. Low-band uses a similar frequency range as LTE/LTE-A, the predecessor to 5G, which is also referred to as 4G communication. Millimeter wave is the fastest, with actual speeds often being 1-2 Gbit/s, at frequencies above 24 GHz, reaching up to 72 GHz. The signal reach of many 5G network access nodes is short and, as such, more cells are required compared to 4G. Further, indoor coverage is limited because millimeter waves have difficulty traversing walls and windows. 5G mid-band is the most widely deployed because it offers a compromise between speed and signal reach.

5G networks support numerous and different types of communications that provide ultrahigh-speed service delivery and connect a massive number of devices. For example, 5G networks support massively interconnected devices for Internet-of-Things (IOT), mobile broadband (MBB), vehicle-to-everything (V2X), machine-to-machine (M2M), machine-to-everything (M2X), ultra-reliable low latency communication (URLLC), machine-type communication (MTC), and other communications. Each of these communication types may have different transmission and latency requirements. Moreover, 5G networks can require efficient allocation of resources while minimizing conflicts and interference.

Most of these communications and devices are harmless to 5G networks. However, a small fraction (about 5-10%) of IoT and V2X communications pose serious security risks to 5G networks. Similarly, a small fraction (about 2-5%) of mobile broadcast sessions are connected in unsecured and/or rogue rural area networks that are unsecure. Thus, although the majority of interconnected devices on networks are safe, dependable, and reliable, 5G wireless networks create a greater number of vulnerabilities compared to other communication networks. The vulnerabilities cannot be addressed with conventional network hardening techniques because deployment across a massively diverse network of devices is cost-prohibitive, resource intensive, and thus impractical.

BRIEF DESCRIPTION OF THE DRAWINGS

Embodiments of the present technology will be described and explained through the use of the accompanying drawings.

Figure 1:
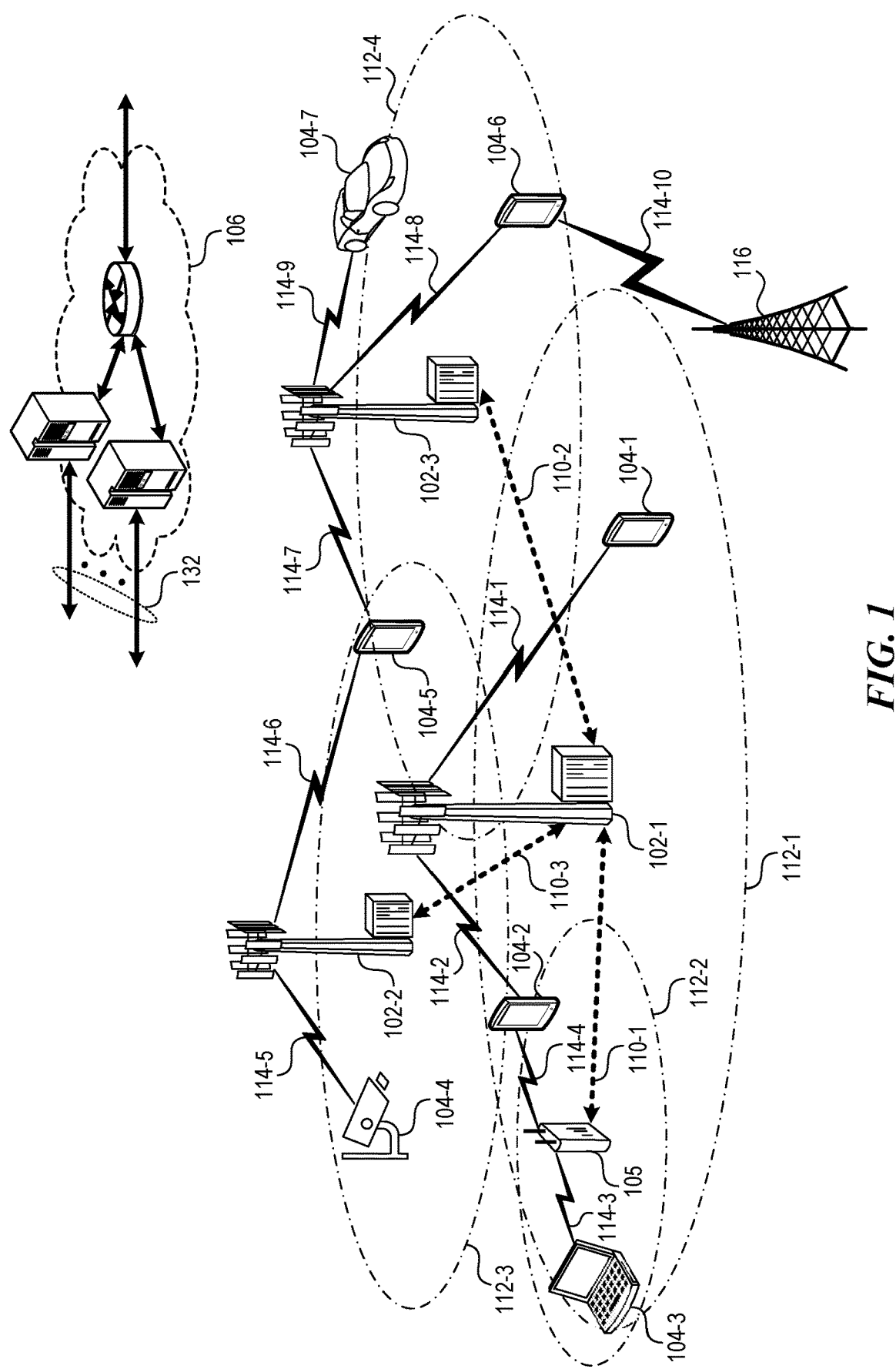
FIG. 1 is a block diagram that illustrates a wireless communication system.

The drawings, some components and/or operations can be separated into different blocks or combined into a single block when discussing some embodiments of the present technology. Moreover, while the technology is amenable to various modifications and alternative forms, specific embodiments have been shown by way of example in the drawings and are described in detail below. The intention, however, is not to limit the technology to the particular embodiments described herein. On the contrary, the technology is intended to cover all modifications, equivalents, and alternatives falling within the scope of the technology as defined by the appended claims.

DETAILED DESCRIPTION 5G will vastly increase the number and types of interconnected devices that access service provider networks. Left unsupervised, these devices are vulnerable to cyberattacks that could, in turn, cause a 5G network to be vulnerable to the attacks. For example, endpoint devices that have been hacked can disrupt customer services, launch malicious activity that disrupts normal network traffic, overwhelm a core network or its surrounding infrastructure with network traffic, or create other malicious attacks.

The disclosed solutions address security risks in 5G wireless networks or other functionally similar networks. Existing security solutions include policies for monitoring and preventing unauthorized access, misuse, modification, or denial of a network and network-accessible resources. For example, network security can involve authorizing uses to control access to a network or data communicated over the network. However, a comprehensive 5G network security technique must address a variety of networks, both public and private, and diverse devices that are commonly used to conduct transactions and communications among businesses, government agencies, and individuals.

The disclosed security solutions include a security layer that can dynamically harden a portion of a network (e.g., more or more cell sites, including 5G small cell sites) in a manner that is transparent to customers by dynamically deploying security resources to address vulnerabilities. The security layer can mitigate risk while avoiding the cost and burden of continuously safeguarding the entire network, and likewise avoid performance degradations associated with maintaining a security architecture that is uniformly deployed over the entire network. Most end points, end users, and their communications are benign, and therefore to harden and burden the entire network against security threats is inelegant and wasteful; instead, the disclosed security solutions intelligently initiate security resources when they are likely to be needed, and place them on standby when not needed.

The disclosed security solutions also include a wireless device (WD) centric security solution that mitigates the risk of vulnerabilities by dynamically provisioning a security resource based on WD-originated or WD-terminated communications (e.g., application-layer transactions) and associated contextual scenarios of the WD. This on-demand security solution can safeguard the entire wireless network infrastructure by resolving vulnerabilities of WDs at the perimeter of the network, for limited time periods.

The disclosed security solutions also include a software-defined security (SDS) service that can safeguard networks and protect a device, application, network, and/or cloud infrastructure of the network. A network can include a software-defined network for telecommunications, enterprise, private cloud, public cloud, hybrid cloud, and/or multi cloud networks. The SDS can be embodied as a virtual network function (vNF) that turns on or initiates when an elevated risk of contamination to a network is detected and turns off or goes into a standby mode when the risk of contamination is mitigated. In one example, network resources are provisioned according to a load ratio between a whitelist and a blacklist of contaminated nodes.

The disclosed security solutions also include a self-cleaning function that leverages a "bait and switch" technique to protect a 5G radio access network (RAN). The self-cleaning function simulates a vulnerability to bait unauthorized intrusions to a wireless network, and then quarantines the intrusions, users or devices from which the intrusions originate or terminate. The self-cleaning function can be dynamically instantiated on-demand during runtime execution of a network access node and, as such, safeguard and protect the 5G wireless network infrastructure from cybersecurity attacks through network access nodes that implement diverse service environments.

The described security solutions can thus efficiently safeguard a wireless network infrastructure by using various detection techniques to dynamically deploy sufficient security resources on-demand while an elevated security risk persists. Additional techniques are described in related applications including U.S. patent application Ser. No. 16/864,083, filed Apr. 30, 2020, titled "5G Enabled Massively Distributed On-Demand Personal Cloud System and Method," U.S. patent application Ser. No. 16/874,641, filed May 14, 2020, titled "5G Cybersecurity Protection System," U.S. patent application Ser. No. 16/874,649, filed May 14, 2020, titled "5G Cybersecurity Protection System Using Personalized Signatures," U.S. patent application Ser. No. 16/874,659, filed May 14, 2020, titled "Intelligent gNodeB Cybersecurity Protection System," U.S. patent application Ser. No. 16/849,098, filed Apr. 15, 2020, titled "On-Demand Wireless Device Centric Security for a 5G Wireless Network," U.S. patent application Ser. No. 16/849,224, filed Apr. 15, 2020, titled "Self-Cleaning Function for a Network Access Node of a Network," and U.S. patent application Ser. No. 16/849,158, filed Apr. 15, 2020, titled "On-Demand Security Layer for a Wireless Network," each of which are incorporated by reference in their entireties for all purposes.

Various embodiments of the disclosed systems and methods are described. The following description provides specific details for a thorough understanding and an enabling description of these embodiments. One skilled in the art will understand, however, that the invention can be practiced without many of these details. Additionally, some well-known structures or functions may not be shown or described in detail for the sake of brevity. The terminology used in the description presented below is intended to be interpreted in its broadest reasonable manner, even though it is being used in conjunction with a detailed description of certain specific embodiments of the invention.

Although not required, embodiments are described below in the general context of computer-executable instructions, such as routines executed by a general-purpose data processing device, e.g., a networked server computer, mobile device, or personal computer. Those skilled in the relevant art will appreciate that the invention can be practiced with other communications, data processing, or computer system configurations, including: Internet appliances, handheld devices, wearable computers, all manner of cellular or mobile phones, multi-processor systems, microprocessor-based or programmable consumer electronics, set-top boxes, network PCs, mini-computers, mainframe computers, media players and the like. Indeed, the terms "computer," "server," and the like are generally used interchangeably herein, and refer to any of the above devices and systems, as well as any data processor.

While aspects of the disclosed embodiments, such as certain functions, can be performed exclusively or primarily on a single device, some embodiments can also be practiced in distributed environments where functions or modules are shared among disparate processing devices, which are linked through a communications network, such as a Local Area Network (LAN), Wide Area Network (WAN), or the Internet. In a distributed computing environment, program modules can be located in both local and remote memory storage devices.

Aspects of the disclosed inventions can be stored or distributed on tangible computer-readable media, including magnetically or optically readable computer discs, hard-wired or preprogrammed chips (e.g., EEPROM semiconductor chips), nanotechnology memory, biological memory, or other data storage media. In some embodiments, computer implemented instructions, data structures, screen displays, and other data under aspects of the invention can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme).

FIG. 1 is a block diagram that illustrates a wireless communication system 100 ("system 100") according to some embodiments of the present disclosure. The system 100 includes base stations 102-1 through 102-3 (referred to individually as "base station 102" or collectively as "base stations 102"). A base station can also be referred to as a cell site, a base transceiver station, a radio base station, an access point, a radio transceiver, a gNodeB (gNB), NodeB, eNodeB (eNB), Home NodeB, a Home eNodeB, or some other suitable terminology.

The base stations 102 are network access nodes of a network formed by the system 100, which also includes UEs 104-1 through 104-7 (referred to individually as "UE 104" or collectively as "UEs 104"), and a core network 106. The UEs 104-1 through 104-7 are a type of wireless devices (WDs) are capable of communication using 5G connectivity. For example, a 5G communication channel may use mmW access frequencies of 28 GHz. In some embodiments, the UE 104 may be operatively coupled to a base station 102 over an LTE/LTE-A communication channel, which is referred to as a 4G communication channel. Therefore, although embodiments relate to 5G connectivity, the embodiments can also apply to 4G or another type of connectivity.

The core network 106 may provide, manage, or control security services, user authentication, access authorization, tracking, Internet Protocol (IP) connectivity, and other access, routing, or mobility functions. The base stations 102 interface with the core network 106 through a first set of backhaul links 108 (e.g., S1) and can perform radio configuration and scheduling for communication with the UEs 104, or can operate under the control of a base station controller (not shown). In some examples, the base stations 102 may communicate, either directly or indirectly (e.g., through the core network 106), with each other over a second set of backhaul links 110-1 through 110-3 (e.g., X1), which may be wired or wireless communication links.

The base stations 102 can wirelessly communicate with the UEs 104 via one or more base station antennas. Each of the cell sites can provide communication coverage for a respective geographic coverage area (coverage areas 112-1 through 112-4, referred to individually as "coverage area 112" or collectively as "coverage areas 112"). The geographic coverage area 112 for a respective base station 102 may be divided into sectors making up only a portion of the coverage area (not shown). The system 100 may include base stations 102 of different types (e.g., macro and/or small cell base stations). In some embodiments, there may be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low latency communication (URLLC), machine-type communication (MTC)).

In some embodiments, the system 100 can include a 5G network, an LTE/LTE-A network, etc. For example, in an LTE/LTE-A network, the term eNB is used to describe the base stations 102 and, in 5G or New Radio (NR) networks, the term gNBs is used to describe the base stations 102. The system 100 can include a millimeter wave (mmW) communication network (e.g., WiGig). The term UE is generally used to describe the UEs in or LTE/LTE-A networks. The system 100 may be a heterogeneous network in which different types of base stations provide coverage for various geographical regions. For example, each base station 102 may provide communication coverage for a macro cell, a small cell, and/or other types of cell. The term "cell" is used in 3GPP and relates to a base station, a carrier or component carrier associated with the base station, or a coverage area (e.g., sector) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, and may operate in the same or different (e.g., licensed, unlicensed) frequency bands as macro cells. Examples of small cells include pico cells, femto cells, and micro cells. A pico cell may cover a relatively smaller geographic area and may allow unrestricted access by UEs with service subscriptions with the network provider. A femto cell covers a relatively small geographic area (e.g., a home) and may provide restricted access by UEs having an association with the femto cell (e.g., UEs in a closed subscriber group (CSG), UEs for users in the home). A base station may support one or multiple (e.g., two, three, four, and the like) cells (e.g., component carriers).

The communication networks that accommodate various disclosed examples can be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer, to improve link efficiency. In the control plane, the Radio Resource Control (RRC) protocol layer may provide establishment, configuration, and maintenance of an RRC connection between a UE 104 and the base stations 102 or core network 106 supporting radio bearers for the user plane data. At the Physical (PHY) layer, the transport channels may be mapped to physical channels.

As illustrated, the UEs 104 are distributed throughout the system 100, where each UE 104 can be stationary or mobile. A UE can also include or be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or the like. A UE may be a mobile phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs/gNBs, small cell eNBs/gNBs, relay base stations, and the like. A UE may also be able to communicate with other UEs either within or outside the same coverage area of a base station via device-to-device (D2D) communications.

The communication links 114-1 through 114-10 (referred to individually as "communication link 114" or collectively as "communication links 114") shown in system 100 may include uplink (UL) transmissions from a UE 104 to a base station 102, and/or downlink (DL) transmissions, from a base station 102 to a UE 104. The downlink transmissions may also be called forward link transmissions while the uplink transmissions may also be called reverse link transmissions. Each communication link 114 may include one or more carriers, where each carrier may be a signal composed of multiple sub-carriers (e.g., waveform signals of different frequencies) modulated according to the various radio technologies described above. Each modulated signal may be sent on a different sub-carrier and may carry control information (e.g., reference signals, control channels), overhead information, user data, etc. The communication links 114 may transmit bidirectional communications using FDD (e.g., using paired spectrum resources) or TDD operation (e.g., using unpaired spectrum resources). In some embodiments, the communication links 114 include LTE and/or mmW communication links.

In some embodiments of the system 100, base stations 102 and/or UEs 104 include multiple antennas for employing antenna diversity schemes to improve communication quality and reliability between base stations 102 and UEs 104. Additionally or alternatively, base stations 105 and/or UEs 104 may employ multiple-input, multiple-output (MIMO) techniques that may take advantage of multi-path environments to transmit multiple spatial layers carrying the same or different coded data.

In some embodiments, the UEs 104 are capable of communicating signals via the LTE network and an mmW system (e.g., as a part of a 5G/NR system). Accordingly, the UE 104 can communicate with the base station 102 over an LTE link. Additionally, the UE 104 can communicate with a transmission point (TP), a base station (BS) (capable of mmW system communication), or a mmW base station over an mmW link. In another example, at least one of the base stations 102 may be capable of communicating signals via the LTE network and the mmW system over one or more communication links 114. As such, a base station 116 may be referred to as an LTE+mmW eNB or gNB or as an LTE+mmW TP/BS/mmW-BS.

On-Demand Security Layer for a Wireless Network

A wireless network can have hotspots that pose risks to the entire network. For example, a particular cell site of a 5G network can expose the entire network to a malicious activity. In one example, network traffic from a rogue endpoint device covered by a cell site can lack robust safeguards from malware or malicious activity. The entire 5G network could be contaminated through the cell site due to the endpoint device. A solution includes deploying robust security resources across the entire network, where the security resources operate continuously to protect the network. However, this solution is cost-prohibitive and would degrade network performance as well as customer experience.

The present solution addresses the aforementioned and other drawbacks with a dynamic security layer that can protect an entire network by provisioning limited security resources to only risky portions of the network, on-demand. For example, in the context of a 5G network, a 5G security layer (5G-S) can intelligently and dynamically instantiate during runtime execution of a service environment in order to safeguard the entire 5G network from cybersecurity attacks. The 5G-S can address an elevated security risk by deploying security resources to a cell site or other regions that could contaminate the entire network.

The 5G-S can leverage and repurpose existing security resources that are distributed across the network. The security resources can be provisioned from across cell sites of the network only when needed, as determined based on conditions of the network. The 5G-S is suitable for safeguarding a wide range of service environments including mobile MBB, IOT, V2X, M2M, and M2X service environments. The service environments are unequal in that certain devices of service environments are more prone to security risks. For example, compared to smartphones, IoT devices are low cost, low performance devices that intermittently connect to a network but offer less robust safeguards. In another example, a V2X service environment is dynamic because vehicles move through different cell sites, which include some that employ less robust security mechanism. To address these inequalities in safeguards, the 5G-S is instantiated on-demand and can be contextually driven.

For example, during business-as-usual (BAU) operations, which can be defined by time periods or in certain service environments, the 5G-S may not provision or consume any of the limited security resources. Instead, a nominal resource is used for BAU operations. The 5G-S is not instantiated because the security risk is low and the network infrastructure does not require an additional safeguard. Instead, the 5G-S can dynamically harden only a risky area of the network, during a risky time period, and/or in a risky service environment. Thus, the 5G-S is leveraged to safeguard and protect the entire network when a risk becomes present by provisioning safety resources to a particular portion of the network (e.g., a cell site, such as any manner of 5G small cell site).

An example of a condition that can activate or deactivate an instance of the 5G-S includes a network traffic surge. In particular, because network traffic can surge from time-to-time, the 5G-S can be turned-off when the network is suddenly experiencing an overload condition and/or congestion. This allows the re-assignment of a nominal resource to support operations during the overload or congestion. Once the network traffic returns to normal, the 5G-S can resume by provisioning a security resource to protect the 5G infrastructure by safeguarding an area of the 5G network. As a result, users will not experience service degradation during high usage periods while the 5G-S can intelligently allocate security resources in a manner that is transparent to users. Thus, the 5G network can leverage security resources of the 5G-S at the edge of the network (e.g., at cell sites) to guard upstream resources of a core network when faced with an elevated cybersecurity risk.

In one example, a high-profile individual (e.g., politician) may be traveling to (or through) a geographic location. The individual may have a mobile phone that would benefit from enhanced security to protect against malicious activity. The telecommunications network that supports the mobile phone in the geographic location can have dormant resources that could provide the enhanced security.

A controller, such as a universal data management (UDM) node, can be triggered to respond to the presence of the individual in the geographic location by provisioning additional resources. For example, when the individual's mobile phone connects to a cell site of the supporting telecommunications network, the controller receives the information indicative of the individual and/or the individual's mobile phone. For example, the controller can obtain the mobile phone's international mobile equipment identifier (IMEI) from its SIM or the individual's international mobile subscriber identifier (IMSI) from the network carrier. By knowing the geographic location, individual, and/or mobile phone, the 5G-S can dynamically deploy security resources to cell sites that could support the individual's mobile phone in the geographic location. For example, the controller can process the NEI and IMSI by comparing that information against a database of subscribers of the network carrier. If the controller deems that the individual could benefit from additional security resources, the controller can cause the 5G-S to deploy security resources for cell sites that are in or near the geographic region. As a result, the security at the geographic location is enhanced.

Figure 2:
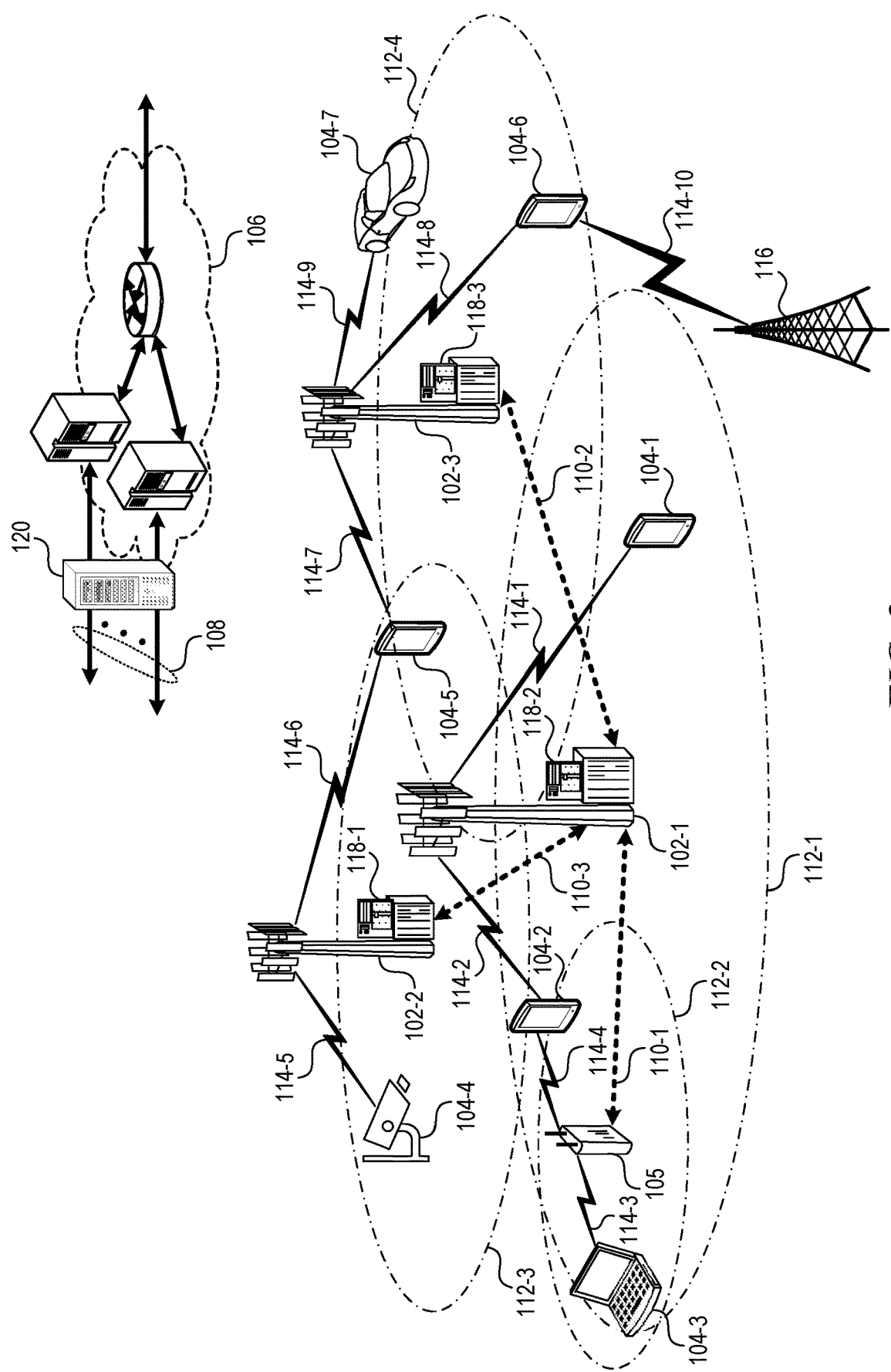
FIG. 2 is a block diagram that illustrates a wireless communication system augmented with security resources.

FIG. 2 is a block diagram that illustrates the system 100, augmented with components of a security layer. As illustrated, the system 100 includes multiple security resources 118-1 through 118-3 (referred to individually as "security resource 118" or collectively as "security resources 118") of the security layer. The security resources 118 are coupled to the base stations 102 (cell sites) that provide coverage areas for multiple UEs 104 (or, more generally, WDs) in different service environments.

In some embodiments, the security resources 118 include compute resources or storage resources that are dedicated for network security. As shown, the security resources are coupled to the system 100 but are independent of nominal resources of the wireless network that handle wireless communications. A specific example of a security resource is an encryption mechanism that can secure data communications.

Another example of a deployable resource includes security profiles for the network nodes stored at the UDM, policy definition function (PDF) resources, etc. In general, any computing or communications resource of any network node can be allocated to a cell site based on a security level. Hence, even nominal resources (e.g., non-security) of the network (e.g., network functions) can be allocated to support security thereby operating as security resources. In other example, in response to detecting an elevated risk, a greater amount of nominal resources can be utilized to mitigate a threat.

The security layer can be managed centrally by a controller 120 located upstream at or near the core network 106. The controller 120 can pool the disparate security resources 118 of the cell sites and partition a combination of suitable security resources for a risky cell site based on a risk level. The controller 120 can maintain operation of the provisioned security resources active for a risky cell site only while the elevated risk level continues. In another example, the controller 120 dynamically provisions two or more of the security resources 118 by partitioning a portion of a security resource 118 at a neighboring cell site for the cell site that is experiencing an elevated risk level. In another example, the controller 120 can allocate security resources of multiple neighboring cell sites to a risky cell site.

Figure 3:
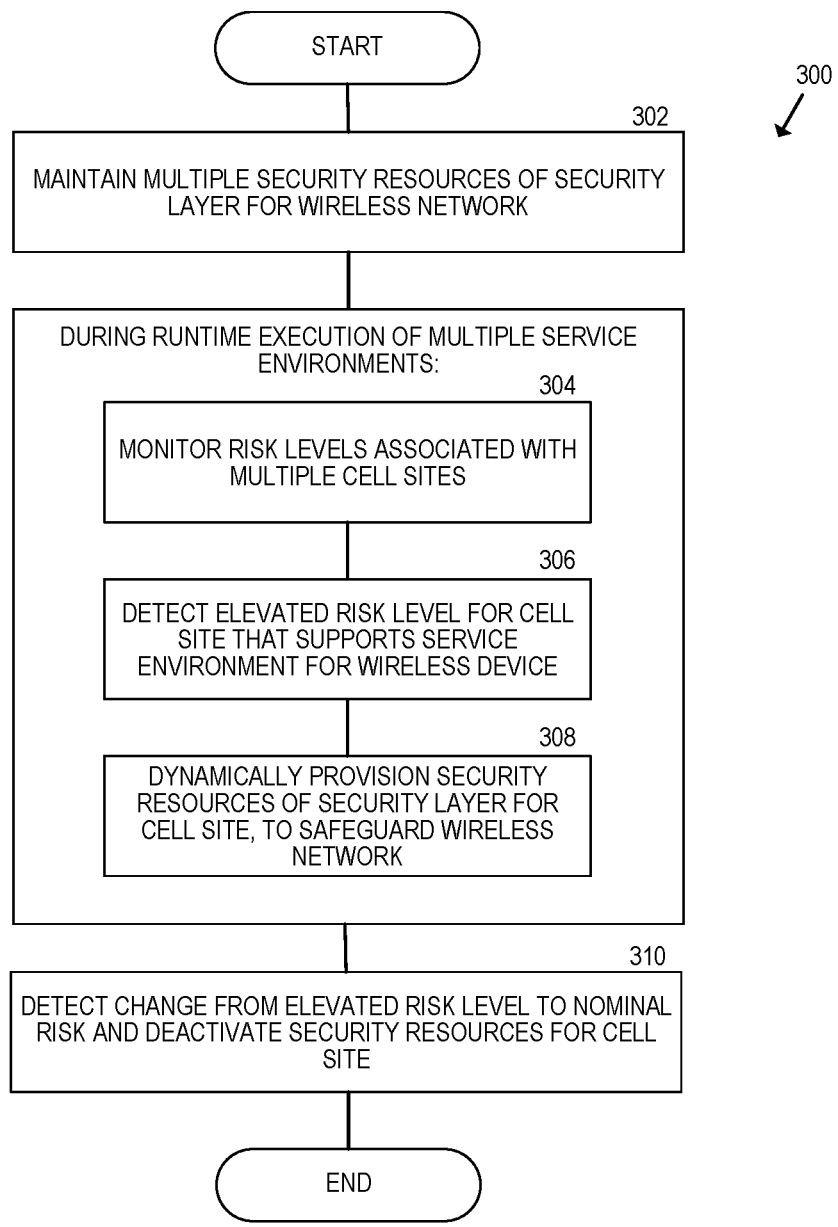
FIG. 3 is a flowchart that illustrates a process to dynamically provision security resources during runtime execution of a service environment.

FIG. 3 is a flowchart that illustrates a process 300 performed by the security layer to dynamically provision security resources during runtime execution of a service environment, to thereby safeguard the entire wireless network from a security risk. Although described primarily in the context of UEs connected to a 5G network, the 5G-S is generally a security layer that can be implemented in any combination of networks including, for example, public and/or private cloud networks that service a variety of WDs.

In 302, a controller (e.g., 5G-S controller 120) maintains multiple security resources of a security layer for a wireless network. The multiple security resources are distributed across multiple cell sites that provide coverage areas for multiple WDs in multiple service environments. Moreover, the security resources are dedicated resources for safeguarding the cell sites and can be inactive by default during runtime execution of service environments. For example, the controller can keep an inventory of security resources at different cell sites, an indication of the scope of each resource, and their flexibility to address the security needs of other cell sites. In another example, information about the security resources are maintained in a decentralized manner (e.g., in a blockchain). The nominal resources, in contrast, are dedicated for their respective cell sites. During runtime execution of the service environments, the 5G-S controller can dynamically provision security resources to mitigate the effect of elevated security risks.

In 304, the controller monitors risk levels associated with the multiple cell sites. Each risk level is associated with an indication of a vulnerability to the wireless network. For example, the controller can periodically monitor a particular cell site prior to detecting an elevated risk level (e.g., under BAU conditions) and continuously monitor the particular cell site while detecting the elevated risk level (e.g., under risky conditions). The controller can also continuously monitor a particular cell site only while the elevated risk level continues.

In one example, components of a monitoring system are installed at the controller and cell sites, which report monitored information to the controller. That is, a monitoring system can include software distributed over network nodes (e.g., network access nodes, wireless devices). A control component at a centralized node can control agent components that are distributed throughout the network on respective network nodes. The agent components monitor the network nodes and communicate the monitored information to the control component of the controller.

In 306, the controller detects an elevated risk level for a particular cell site that supports a particular service environment including a particular WD. For example, the elevated risk level can be determined based on a location of the particular cell site and a type or amount of network traffic in the particular cell site relative to an expected amount of network traffic based on historic information. In another example, the elevated risk level indicates any of an unauthorized activity by the particular WD, an unauthorized intrusion into the wireless network, or susceptibility of a cell site to malware.

In 308, in response to detecting an elevated risk level, the controller can cause the security layer to dynamically provision security resources for the particular cell site to safeguard the wireless network. The security resources can include a security resource from a cell site other than the particular cell site. For example, the controller can dynamically provision security resources by causing a cell site to partition a portion of its security resource for a neighboring cell site that is experiencing an elevated security risk.

The security resources can be provisioned according to a programmed logic that is customized for a particular network. The logic can manage network resources in a cluster and cause deployment of security resources in accordance with programmed rules. For example, the logic can prioritize more security resources for higher security levels and cause allocation for a target node based on the status or availability of the security resources, which can be communicated to the controller by local agent components. The logic can have rules that specify the order in which the security resources are deployed.

As used herein, neighboring cell sites may have overlapping or non-overlapping coverage areas. For example, a micro cell that is subsumed in a macro cell could be a neighboring cell to the macro cell. In another example, the controller can dynamically pool security resources of multiple neighboring cell sites and allocate any portion of the pool to the particular cell site. Hence, the controller can select a combination of security resources for a particular cell site based on its elevated risk level. The controller can maintain operation of the provisioned security resource for a particular cell site for as long as the elevated risk level persists.

In 310, the controller detects a change from the elevated risk level to a nominal risk and, as such, deactivates the security resources for the particular cell site. For example, the controller can detect that the risk has been mitigated or that traffic congestion associated with the particular cell site has changed or the security layer has entered a time period that reduces the elevated risk to a nominal risk relative.

On-Demand Wireless Device Centric Security for a Wireless Network

While the aforementioned security layer targets nodes upstream of endpoint devices, another disclosed solution is centered on the WDs. This WD-centric solution mitigates risks by dynamically provisioning security resources based on WD-originated or WD-terminated communications such as application-layer transactions. As such, this on-demand security capability can safeguard an entire network infrastructure by targeting endpoint devices on the perimeter of the network, for limited time periods.

An architecture for the solution can include a mobility management function in an IMS network that assigns security resources to WDs and continues monitoring and/or modifying security resources to support each application-layer communication. The security resources can be allocated during setup of an application and modified during runtime based on the continuous monitoring of the application on the WD. In one example, a UDM node can manage a security profile that governs the behavior of user traffic, another node or function can manage a security profile that governs the dynamic behavior of the user traffic, and/or another node or function can manage security policy enforcement and incremental modification.

The management function can assess a contextual scenario (e.g., time-of-day, device, location, event, surroundings, user profile, past history) and instantaneously determine whether an application-layer transaction can expose sensitive user information (e.g., customer performing credit, banking, or healthcare transaction) and/or risks sharing sensitive or private information (e.g., SSN, DOB, HIPPA) unintentionally. In one example, an application session is established, which allows the network to identify a transaction that exposes data through an individual's wireless device. A controller can monitor the transactions of a wireless device based on an application ID, service ID, or custom ID that indicates, for example, that an identified transaction poses a security risk. The controller can include a database that lists the types of transactions that warrant enhanced security. Upon detecting an increased risk, the network can automatically turn-on a security controller that assigns an appropriate application security policy (e.g., high, medium, or low risk), and assigns a proportional security resource to support an application-layer transaction. Upon detecting a decreased threat risk, the network automatically turns-off the security controller, re-assigns the appropriate application security policy in (e.g., high, medium, or low risk), and assigns an appropriate nominal resource to continue supporting the application-layer transaction.

In some embodiments, a security resource can be provisioned when a security risk exceeds a threshold value, which can be determined automatically by the management function, manually by a network planner, or overridden by a network operation center (NOC) during emergency or natural disasters (e.g., earthquake, fire, or tsunami). Hence, the system can release security resources and make them available in an emergency. The security mechanism is dynamic because it can be turned off (e.g., sleep mode) when a security resource is unavailable (e.g., during busy hours) and turned on (i.e., awaken) when the security resource is abundant and available (e.g., during late night or non-busy hours).

Figure 4:
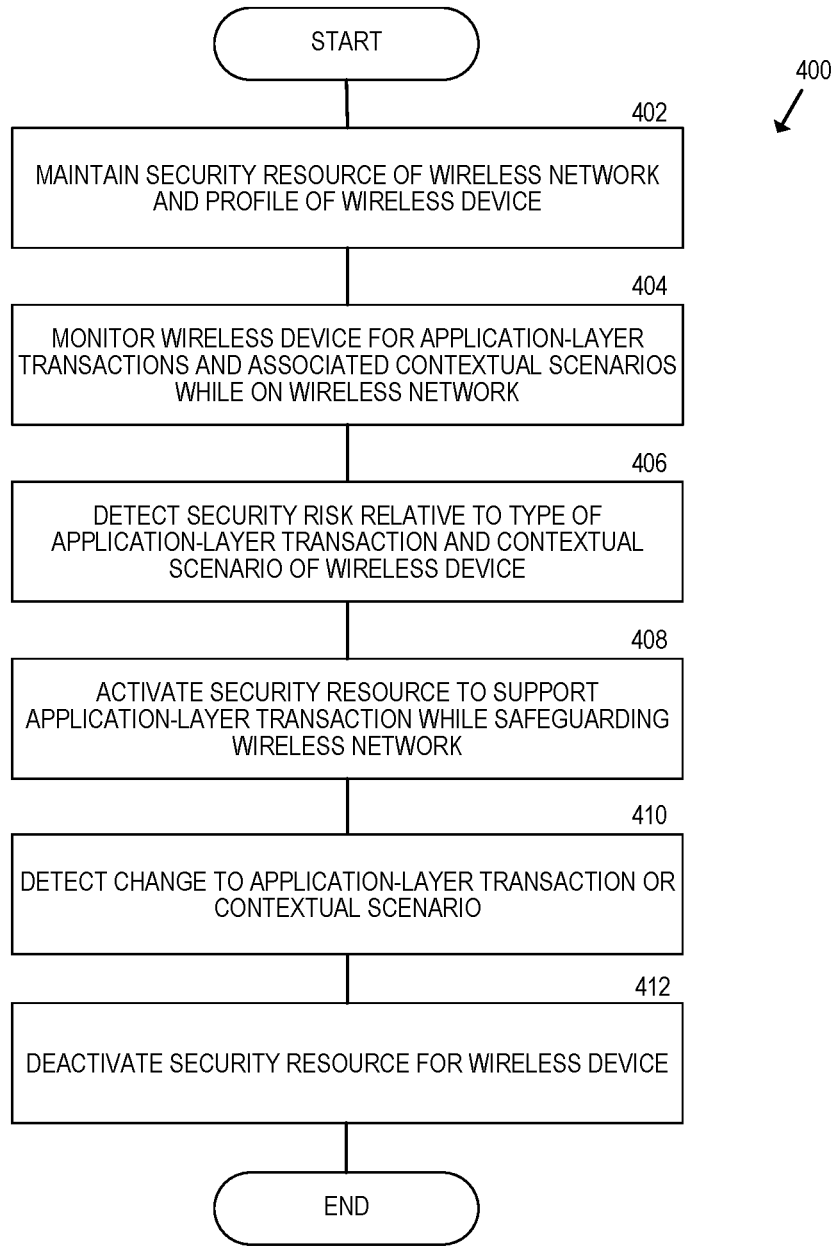
FIG. 4 is a flowchart that illustrates a process to address a security risk arising from an application-layer transaction and contextual scenario of a wireless device.

FIG. 4 is a flowchart that illustrates a process 400 performed to mitigate a security risk arising from an application-layer transaction and associated contextual scenario of a WD. The WD is an endpoint device of the wireless network. Examples of WDs include UE, IOT, V2X, M2M, and M2X devices. Examples of wireless networks include telecommunications, enterprise, public cloud, private cloud, and hybrid networks. As described below, when a security risk arises, a security resource is dynamically deployed to any of multiple WDs on any of multiple wireless networks.

In 402, the system (e.g., controller 120) maintains security resources and profiles associated with WDs. A profile can include, for example, an indication of an identity of a user of a WD. In some embodiments, a security resource is inactive by default and configured for on-demand activation in response to a risk level associated with a communication (e.g., application-layer transaction) of the WD on the wireless network. Examples of application-layer transactions include WD-originated or WD-terminated transactions communicated over the wireless network.

In 404, the system monitors the WD for application-layer transactions and associated contextual scenarios while on the wireless network. For example, the system can periodically monitor the WD on the wireless network while the WD is in a first contextual scenario and continuously monitor the WD while in a second contextual scenario, where the second contextual scenario is riskier than the first contextual scenario. As indicated earlier, a contextual scenario can indicate, based on an identity of the user, that the particular application-layer transaction requires safeguarding due to an elevated risk of a cyberattack.

In 406, the system detects a security risk relative to a particular type of a particular application-layer transaction and associated contextual scenario of the WD. The security risk can be detected by determining that the particular type of the particular application-layer transaction exposes sensitive user information (e.g., healthcare information). An example of a contextual scenario includes a combination of a time associated with the particular application-layer transaction, the location of the WD, and a user indicated in the profile of the WD. Hence, the particular contextual scenario can be based on a location of the wireless device while the particular application-layer transaction is ongoing and based on the profile associated with the wireless device.

The system can detect the security risk relative to criteria/ thresholds including a pre-selected location, a pre-selected time range, and a classification of a user operating the WD. For example, a contextual scenario can indicate whether a user of the WD is conducting a financial transaction at a festival, a concert, or a sporting event that is susceptible to malicious activities. In another example of an application-layer transaction that could trigger the system is a financial transaction communicated via a banking app running on a mobile device. The transaction is inherently risky because the content of the data being communicated is highly sensitive. In other words, the transaction poses a security risk because of the nature of the information that is being communicated.

In 408, in response to detecting the security risk, the system activates a security resource to support the particular application-layer transaction while safeguarding the wireless network. In one example, the security resource can include an encryption mechanism to secure transmission of data for the particular application-layer transaction. In another example, the system provisions an application security policy for a network access node, such as a gNB, that handles communications with the WD. As such, the network access node that serves the WD can safeguard the particular application-layer transaction.

In 410, the system detects a change to the application-layer transaction or the particular contextual scenario. For example, the system can detect a change in the location of the WD while the application-layer transaction is ongoing. If the new contextual scenario is less risky, the system can activate a nominal resource to continue supporting the particular application-layer transaction on the wireless network. In another example, the system can detect completion of the application-layer transaction and then activate a nominal resource to support subsequent application-layer transactions.

In 412, in response to detecting the change to the application-layer transaction or the particular contextual scenario, the system can deactivate the security resource for the WD. That is, nominal resources are used to support subsequent communications.

Software-Defined Security Service Orchestration

Another disclosed solution includes a software-defined security (SDS) service. A service orchestration engine (the "engine") can be embodied as a virtual network function (vNF) that turns on when a network node detects that a network infrastructure could be contaminated, and turns off when the contamination has been resolved. For example, the engine can monitor runtime behavior of network nodes to identify suspicious activity and then dynamically coordinate a blacklist and a whitelist to classify assets (e.g., physical or virtual functions or nodes) as safe or contaminated. In some embodiments, the whitelists and/or blacklists are stored at a central location (e.g., the UDM) or distributed across a combination of network nodes. The engine also instantiates an environment to isolate and decontaminate assets of the blacklist. For example, the system can remove malware or functionally replace a contaminated asset with an equivalent asset that is not contaminated. Any decontaminated assets are moved from the blacklist to the whitelist, and resources of the network are dynamically adjusted based on a load ratio between the whitelist and the blacklist.

The use of the engine can depend on different times of day. For example, during periods of traffic congestion or busy-hours, the engine can dynamically reduce the priority or weight of contaminated assets to reduce utilization of SDS compute, storage, or I/O resources and only sanitize high priority assets. When the traffic congestion is relieved or during non-busy or evening hours, the engine can dynamically increase the priority or weight of contaminated assets to increase utilization of SDS compute, storage, or I/O resources while still prioritizing highly contaminated assets.

Figure 5:
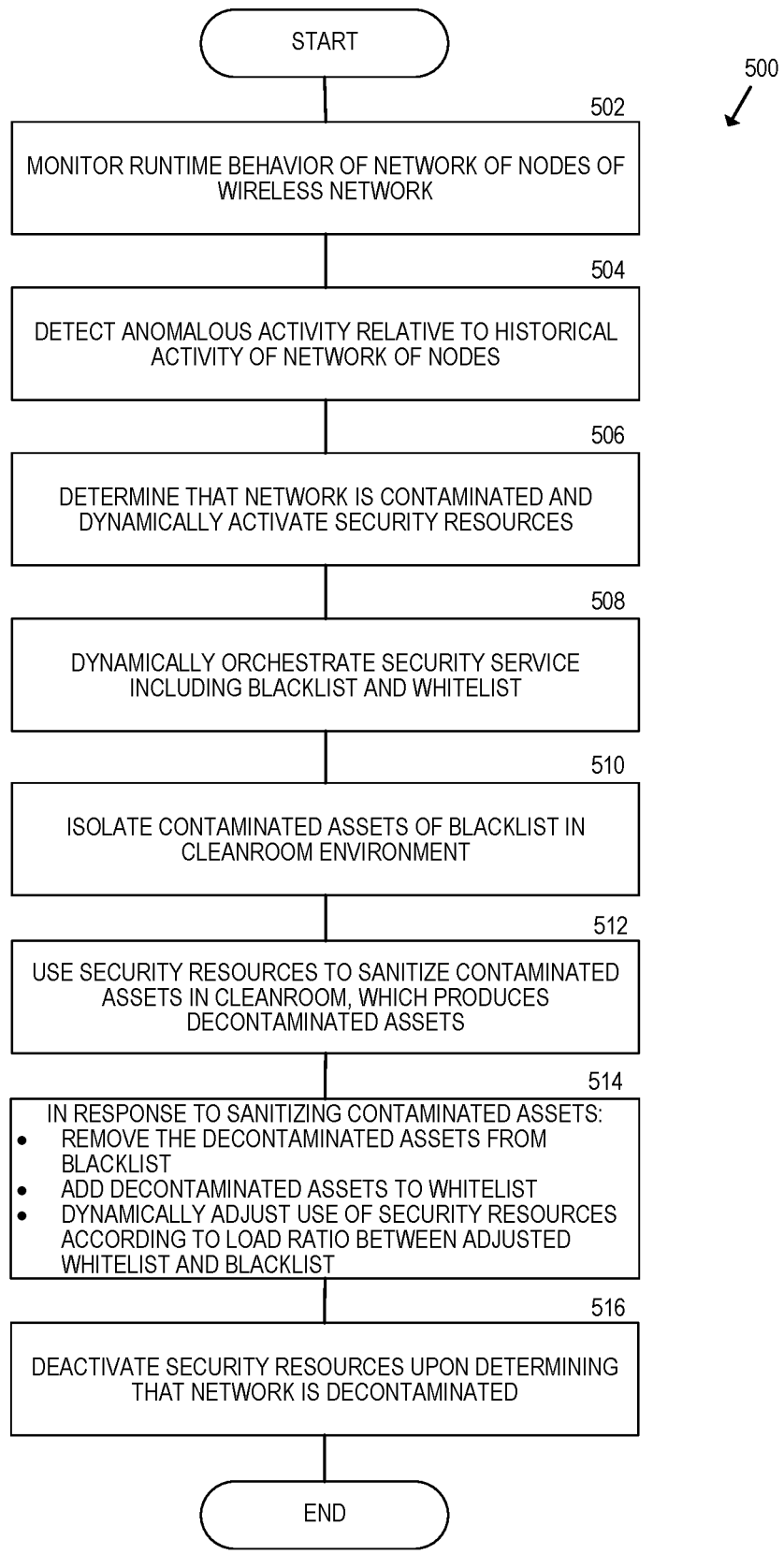
FIG. 5 is a flowchart that illustrates a process performed by a software-defined security service hosted by a virtual network function.

FIG. 5 is a flowchart that illustrates a process 500 performed by an SDS service hosted as a vNF. In one example, the engine coordinates components for the SDS service that are hosted at local and/or remote machines. The SDS service can be intelligently and dynamically instantiated on-demand by the engine during runtime execution of service environments in order to safeguard and protect the entire network from cybersecurity attacks. For example, the engine can activate or deactivate the SDS service in response to changes in a network or network traffic.

In 502, a system monitors runtime behavior of a wireless network. For example, the system can monitor a topology of nodes of a 5G wireless network. In some embodiments, the network of nodes are software-defined nodes of a telecommunications, enterprise, public cloud, private cloud, or hybrid network. In another example, the wireless network is a 5G wireless network that supports different communications standards for MBB, IOT, V2X, M2M, or M2X wireless communications.

In 504, the system detects an anomalous activity relative to historical activity of the network of nodes. The anomalous activity is indicative of a contamination of the network of nodes. The contamination includes unauthorized instructions designed to damage or interrupt a function of the network of nodes. The anomalous activity can include suspicious data communicated by a contaminated node (e.g., virus or malware).

In 506, the system determines that the network is contaminated and dynamically activates the security resources. The "contaminants" can include any software and/or hardware that is designed to intentionally disrupt or harm the network or endpoint devices. An example includes malware such as viruses, worms, Trojan horses, ransomware, spyware, adware, rogue software, and scareware. A contaminant can also include a bug that can unintentionally disrupt or harm the network. Other examples of contaminants include a false base station (FBS), rogue base station (RBS), IMSI catcher or stingray. These contaminants include hardware and software that allow for passive and active attacks against subscribers over RANs.

In 508, the system dynamically coordinates the SDS service including a blacklist and a whitelist. The blacklist includes indications of network assets that are contaminated due to the anomalous activity. The contaminated assets include software or hardware components of the network of nodes. The whitelist includes indications of non-contaminated assets of the network of nodes. The SDS service manages security resources that are allocated based on a load ratio between the blacklist and the whitelist. For example, the blacklist can include a list of functions (e.g., access, routing, or mobility, encoding, decoding, routing) performed by contaminated nodes or a list of the contaminated nodes (e.g., wireless devices, network access nodes).

In one example, a blacklist (or blocklist) is embodied as a table that operates as a control mechanism that allows network elements (e.g., nodes, functions, subscribers, IMSI, IMDI) to operate normally, except those explicitly mentioned. Those items on the list are denied access to the network. The opposite is a whitelist, which means only items on the whitelist are granted access to the network. In some embodiments, the whitelist operates as a greylist that contains items that are temporarily blocked (or temporarily allowed) until an additional step is performed.

In 510, the system functionally isolates the contaminated assets of the blacklist with a cleanroom environment. That is, the system instantiates the cleanroom environment to isolate the contaminated assets. A "cleanroom" refers to any hardware and/or software that forms a closed environment to isolate the data, function, storage, or processing of the contaminated asset from the network. For example, the cleanroom can selectively allow ingress of data from a contaminated asset and block egress to prevent contaminated data from being processed by the network.

In 512, the system uses the security resources to sanitize the contaminated assets associated with the cleanroom environment and thereby produce decontaminated assets. For example, the system can replace a function performed by the contaminated asset with an equivalent function of an uncontaminated asset. The contaminated asset and the uncontaminated asset can be associated with different nodes of the network of nodes. In another example, the system deems that a function of the contaminated asset is non-essential to operation of the network of nodes and, as a result, decommissions the contaminated asset. In yet another example, the system can repair a contaminated asset by quarantining a malware.

In 514, the system, in response to sanitizing the contaminated assets, removes indications of the decontaminated assets from the blacklist and adds indications of the decontaminated assets to the whitelist to thereby produce an adjusted blacklist and an adjusted whitelist. The system can dynamically adjusts use of the security resources according to the load ratio between the adjusted whitelist and the adjusted blacklist. In some embodiments, dynamically adjusting use of the security resources includes detecting traffic congestion on the network of nodes, and dynamically reducing use of security resources to sanitize the contaminated nodes indicated on the blacklist based on a measure of the traffic congestion. In another example, the system dynamically prioritizes some of the contaminated assets of the blacklist for sanitizing. In yet another example, the system dynamically reallocates the security resources based on a period of time designated as non-busy hours to sanitize the contaminated assets of the blacklist. In yet another example, the system dynamically adjusts use of the security resources by detecting traffic congestion or designated busy hours, and then dynamically reduces use of the security resources to sanitize only some of the contaminated assets. Further, upon concluding that the traffic congestion subsided or during designated non-busy hours, the system dynamically increases use of the security resources to sanitize any remaining contaminated assets.

In 516, the system deactivates the security resources upon determining that the network is decontaminated. For example, security resources can be placed in sleep mode. The SDS can thus form a guard-ring that protects a network infrastructure efficiently as security risks change.

Self-Cleaning Function for a Network Access Node of a Network

Another disclosed solution includes a self-cleaning function for a network access node (e.g., gNB) of a radio access network (RAN). The network access node resides in the RAN between a core network and an endpoint WD. A 5G RAN includes multiple gNBs distributed over geographical areas, where each gNBs can provide access by UEs to the core network. The gNBs are coupled to the core network, which offers numerous services to the WDs connected by the network access nodes. In other words, the gNBs are gateways for UEs to access the core network.

The network access nodes are potential entry points for malware introduced by the endpoint WDs. Hence, the network access nodes are more vulnerable to security risks (e.g., malware) because they support diverse types of devices that implement different security features or services. For example, 5G networks support massively interconnected IOT, MBB, V2X, M2M, M2X, URLLC, MTX communications, and the like. For example, once a gNB gets contaminated, the core network, device, and user sensitive data are unsafe and unreliable. Thus, gNBs can safeguard the core network and thereby protect the entire health of the 5G network from malicious endpoint WDs.

The self-cleaning function can leverage a "bait and switch" process in a 5G RAN network. The 5G self-cleaning g-NB function can be intelligently and dynamically instantiated on-demand during runtime execution of any gNB in order to safeguard and protect an entire network infrastructure from cybersecurity attacks from a wide range of environments (e.g., massive IoT, MBB, V2X, M2M, M2X).

In one example, the 5G network infrastructure and user data will become automatically protected by leveraging the self-cleaning g-NB function when a cybersecurity risk exceeds a threshold. Because network traffic can surge from time-to-time, the 5G self-cleaning gNB function can be turned-off when the network is suddenly experiencing overload conditions and/or congestion. Once the network traffic returns to normal, the 5G self-cleaning gNB function will resume and re-instantiate to protect the 5G infrastructure.

Figure 6:
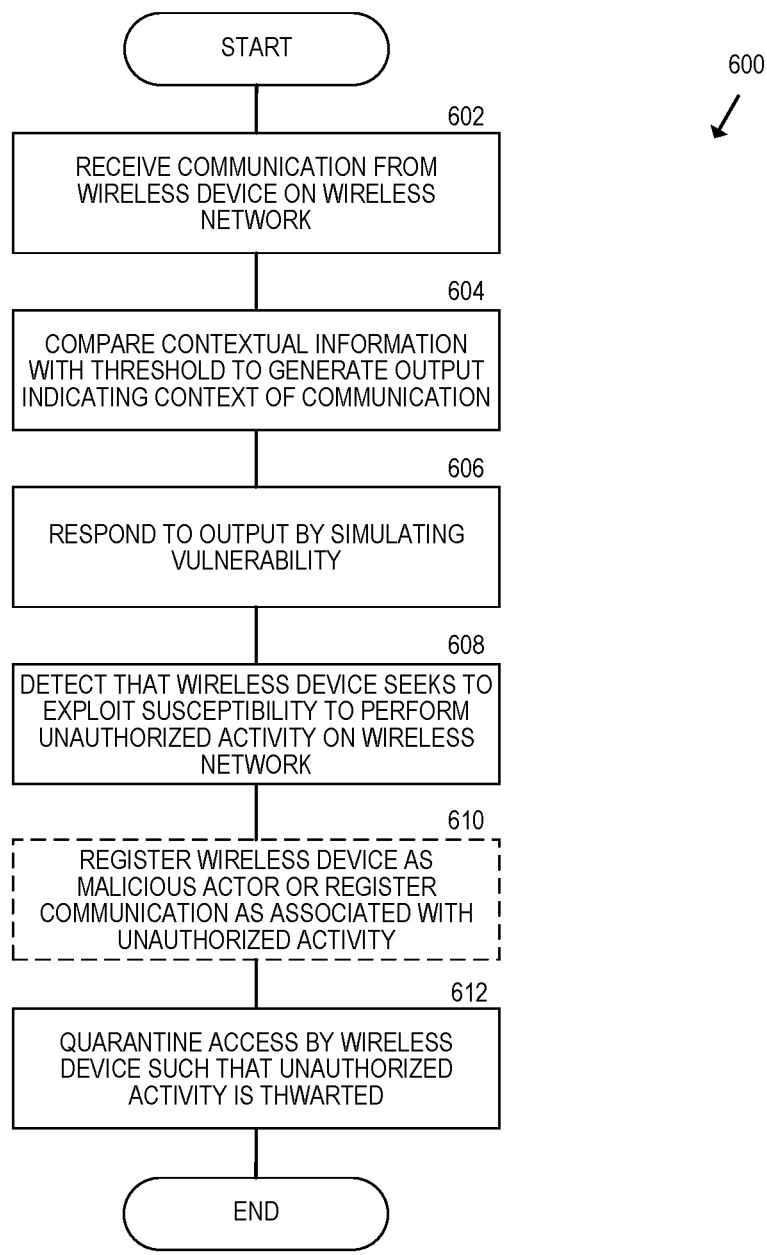
FIG. 6 is a flowchart that illustrates a process performed by a network access node to thwart unauthorized activity on a wireless network.

FIG. 6 is a flowchart that illustrates a process 600 performed by a network access node (e.g., gNB) to thwart unauthorized activity on a wireless network. The process performed by the network access node is referred to as "bait and switch" to lure latent malware or bad actors into exposing their malicious intent so that the bad actors or their activities can be quarantined.

In 602, the network access node receives a communication from a wireless device on the wireless network. The communication includes metadata of the wireless device. For example, the metadata can include contextual information about the wireless device. Further, the wireless device can be an IoT device where the communication is a M2M communication, the wireless device can be integrated in a vehicle where the communication is a V2X communication, or the wireless device can be a UE where the communication is a connection request to connect to the wireless network.

In 604, the network access node compares the contextual information with a threshold to generate an output indicating a context of the communication by the wireless device. Examples of the contextual information include a current location of the wireless device where the threshold is a location-based threshold, or the contextual information indicates a point in time when the communication was sent by the wireless device where the threshold is a time-based threshold. In another example, the contextual information can be associated with an ongoing event such as a sports contest, a music concert, or a festival.

In 606, the network access node responds to the output by simulating a vulnerability. The vulnerability can include a susceptibility of the network access node to allow an unauthorized activity on the network. For example, the network access node can fake the presence of an IMEI or IMSI. The fake IMEI or IMSI can be associated with a high value individual (e.g., politician) that baits malware on a WD connected to the network access node. Examples of the unauthorized activity include an attempted intrusion into the core network, deployment of malware, or any activity of a known bad actor. The simulated vulnerability can occur during runtime execution of a communications link between the WD and the network access node. In another example, the simulation is generated in accordance with a machine learning model that is trained based on known unauthorized activities on the network.

In another example, a simulated vulnerability induces a side channel attack (SCA). An SCA occurs when an attacker learns information about cryptographic secrets by observing or influencing the network on which a code is running. For example, the attacker can observe power consumed when code runs or observe the time that the code takes to run; possibly while influencing other inputs or running other code so as to influence the contents of a cache, or while somehow inducing faults on the network. In one example, the network access node can simulate the information that is observed by the attacker.

In particular, SCA is a network slicing implementation of cryptography. For example, suppose that slices A and B of a network share some underlying hardware. If an attacker can observe or influence how code runs in functions of slice A, the attacker can affect the code running in functions of slice B, or extract information about the code running in slice B. This can allow SCAs; in particular, timing attacks that extract information about cryptographic keys or other secrets in slice B. If the two slices run services with a similar sensitivity, then this does not create a significant benefit for the attacker. But if slice B's service is more sensitive, this could provide an effective, indirect way to attack it.

In 608, the network access node detects that the WD seeks to exploit the susceptibility of the network access node to perform an unauthorized activity on the wireless network. To bait the attacker, in the context of the SCA example, the network access node can simulate a network slice (i.e., fake slice) hosted on the same hardware (e.g., mobile edge computing) as other network slices but that has a different level of sensitivity or different level of vulnerability that can be influenced by an attacker. One slice could support a sensitive service while the fake slice supports experimental network code being run on the same hardware thereby allowing the fake slice to have exploitable bugs that could lead to hostile code running in the other slice.

In 610, the network access node registers the WD as a malicious actor or registers the communication of the WD as being associated with the unauthorized activity. For example, an identifier of the WD, the associated user, or form or type of communication associated with the malicious activity, and/or an indication of the malicious activity itself could be stored on a blacklist.

In 612, the network access node quarantines access to the wireless network via the network access node such that the unauthorized activity is thwarted at the network access node. The access of the wireless device can be an ongoing communication or connection request via the network access node of the wireless network. For example, the network access node can block or prevent communications of the wireless device on the wireless network (e.g., limit communications) or block the wireless device entirely from accessing the wireless network. As such, the unauthorized activity is thwarted by the network access node.

Figure 7:
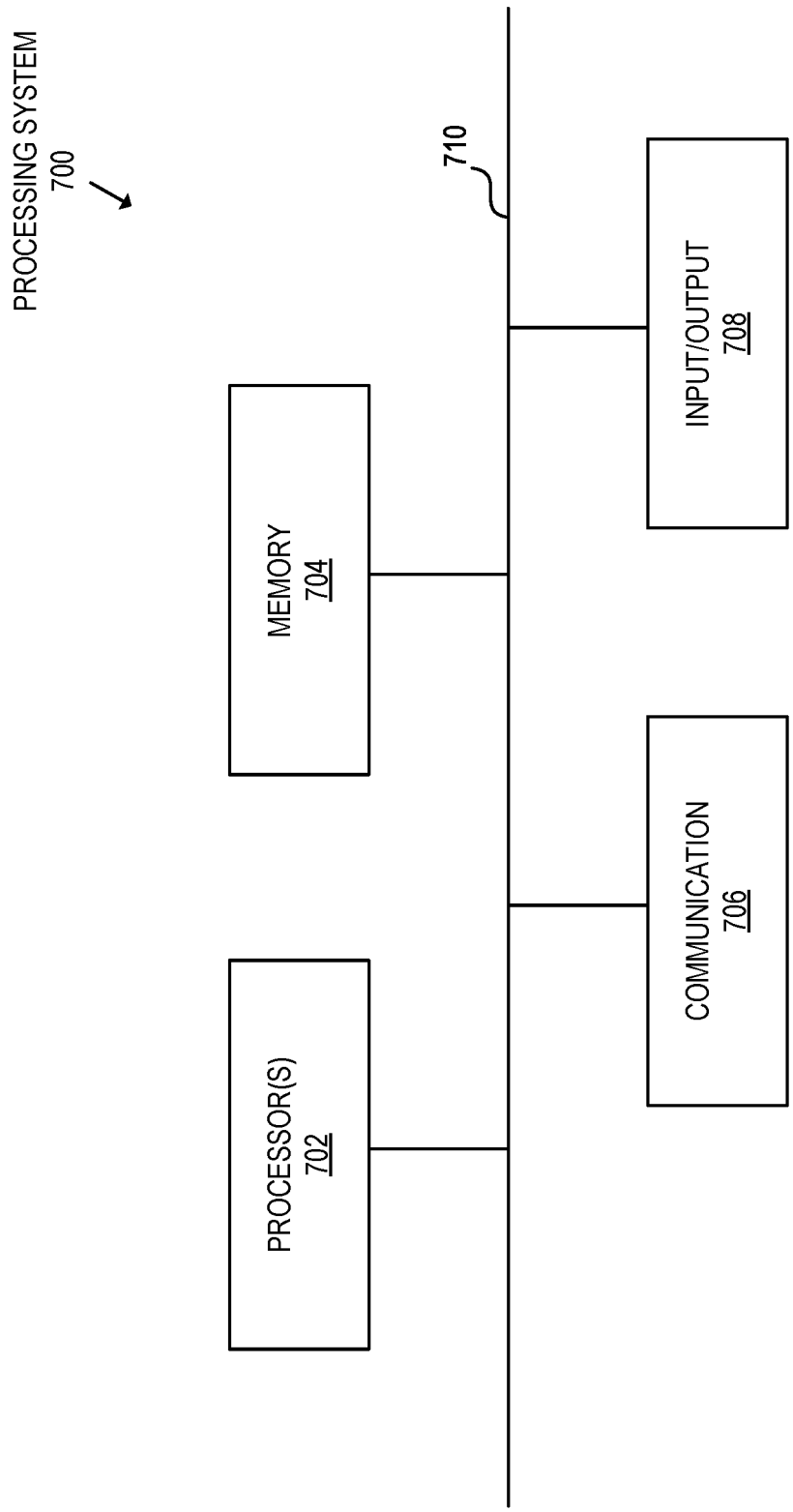
FIG. 7 is a block diagram that illustrates an example processing system in which aspects of the disclosed technology can be embodied.

FIG. 7 is a block diagram that illustrates an example of a processing system 700 in which at least some operations described herein can be implemented. The processing system 700 represents a system that can run any of the methods/algorithms described herein. For example, any network node or wireless device component of an can include or be part of a processing system 700. The processing system 700 can include one or more processing devices, which can be coupled to each other via a network or multiple networks. A network can be referred to as a communication network or telecommunications network.

In the illustrated embodiment, the processing system 700 includes one or more processors 702, memory 704, a communication device 706, and one or more input/output (I/O) devices 708, all coupled to each other through an interconnect 710. The interconnect 710 can be or include one or more conductive traces, buses, point-to-point connections, controllers, adapters and/or other conventional connection devices. Each of the processor(s) 702 can be or include, for example, one or more general-purpose programmable microprocessors or microprocessor cores, microcontrollers, application specific integrated circuits (ASICs), programmable gate arrays, or the like, or a combination of such devices.

The processor(s) 702 control the overall operation of the processing system 700. Memory 704 can be or include one or more physical storage devices, which can be in the form of random-access memory (RAM), read-only memory (ROM) (which can be erasable and programmable), flash memory, miniature hard disk drive, or other suitable type of storage device, or a combination of such devices. Memory 704 can store data and instructions that configure the processor(s) 702 to execute operations in accordance with the techniques described above. The communication device 706 can be or include, for example, an Ethernet adapter, cable modem, Wi-Fi adapter, cellular transceiver, Bluetooth transceiver, or the like, or a combination thereof. Depending on the specific nature and purpose of the processing system 700, the I/O devices 708 can include devices such as a display (which can be a touch screen display), audio speaker, keyboard, mouse or other pointing device, microphone, camera, etc.

While processes or blocks are presented in a given order, alternative embodiments can perform routines having steps or employ systems having blocks, in a different order, and some processes or blocks may be deleted, moved, added, subdivided, combined and/or modified to provide alternative or sub-combinations, or can be replicated (e.g., performed multiple times). Each of these processes or blocks can be implemented in a variety of different ways. In addition, while processes or blocks are at times shown as being performed in series, these processes or blocks may instead be performed in parallel, or can be performed at different times. When a process or step is "based on" a value or a computation, the process or step should be interpreted as based at least on that value or that computation.

Software or firmware to implement the techniques introduced here can be stored on a machine-readable storage medium and can be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random-access memory (RAM), magnetic disk storage media, optical storage media, flash memory devices), etc.

Note that any and all of the embodiments described above can be combined with each other, except to the extent that it may be stated otherwise above, or to the extent that any such embodiments might be mutually exclusive in function and/or structure. Although the present invention has been described with reference to specific exemplary embodiments, it will be recognized that the invention is not limited to the embodiments described but can be practiced with modification and alteration within the spirit and scope of the disclosed embodiments. Accordingly, the specification and drawings are to be regarded in an illustrative sense rather than a restrictive sense.

Physical and functional components (e.g., devices, engines, modules, and data repositories) associated with processing system 700 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory can be volatile or non-volatile memory. In some embodiments, the volatile memory can be considered "non-transitory" in the sense that it is not a transitory signal. Memory space and storage described in the figures can be implemented with the tangible storage memory as well, including volatile or non-volatile memory.

Each of the functional components can operate individually and independently of other functional components. Some or all of the functional components can be executed on the same host device or on separate devices. The separate devices can be coupled through one or more communication channels (e.g., wireless or wired channel) to coordinate their operations. Some or all of the functional components can be combined as one component. A single functional component can be divided into sub-components, each sub-component performing separate method steps or a method step of the single component.

In some embodiments, at least some of the functional components share access to a memory space. For example, one functional component can access data accessed by or transformed by another functional component. The functional components can be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems and devices described above can include additional, fewer, or different functional components for various applications.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database can take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects can likewise be embodied in a computer-readable medium. Accordingly, the inventors reserve the right to add additional claims after filing the application to pursue such additional claim forms for other aspects of the technology.

We claim:

1. A computer-implemented method comprising:
    detecting an anomalous activity of a network of nodes of a wireless network, wherein the anomalous activity is indicative of a contamination of the network of nodes;
dynamically coordinating security service including a blacklist and a whitelist,
  wherein the blacklist includes a list of access, routing, or mobility functions performed by contaminated assets of the network nodes and an indication of the contaminated assets, including wireless devices with a service subscription with a network provider of the wireless network, of the network of nodes that are contaminated due to the anomalous activity,
  wherein the whitelist includes an indication of non-contaminated assets of the network of nodes,
  wherein the security service manages security resources including a first set of the security resources that are allocated to the blacklist and a second set of the security resources that are allocated to the whitelist, and
  wherein the first set and the second set of the security resources are different depending on a load ratio between the blacklist and the whitelist;
using the security resources to decontaminate the contaminated assets; and
in response to the contaminated assets being decontaminated:
  removing indications of the decontaminated assets from the blacklist to thereby produce an adjusted blacklist;
  adding indications of the decontaminated assets to the whitelist to thereby produce an adjusted whitelist; and
  dynamically adjusting use of the security resources according to the load ratio between the adjusted whitelist and the adjusted blacklist.

2. The method of claim 1, wherein using the security resources to decontaminate the contaminated assets comprises:
  replacing a function performed by the contaminated asset with an equivalent function of a non-contaminated asset.

3. The method of claim 1, wherein using the security resources to decontaminate the contaminated assets comprises:
  deeming that a function of the contaminated asset is non-essential to operation of the network of nodes; and
  decommissioning the contaminated asset.

4. The method of claim 1, wherein using the security resources to decontaminate the contaminated assets comprises:
  repairing a contaminated asset by quarantining a malware.

5. The method of claim 1, wherein the network of nodes include software-defined nodes of a telecommunications, enterprise, public cloud, private cloud, or hybrid cloud network.

6. The method of claim 1, wherein the wireless network supports different communications standards for wireless communications comprising:
  mobile broadband (MBB) wireless communications;
  Internet-of-Things (IOT) wireless communications;
  vehicle-to-everything (V2X) wireless communications;
  machine-to-machine (M2M) wireless communications; or
  machine-to-everything (M2X) wireless communications.

7. The method of claim 1, wherein dynamically adjusting use of the security resources comprises:
  detecting traffic congestion on the network of nodes; and
  dynamically reducing use of the security resources to decontaminate the contaminated nodes indicated on the blacklist based on a measure of the traffic congestion.

8. The method of claim 1, whewrein dynamically adjusting use of the security resources comprises:
  dynamically prioritizing some of the contaminated assets of the blacklist for decontaminating.

9. The method of claim 1, wherein dynamically adjusting use of the security resources comprises:
  dynamically reallocating the security resources based on a period of time designated as non-busy to decontaminate the contaminated assets of the blacklist.

10. The method of claim 1, wherein dynamically adjusting use of the security resources comprises:
  during traffic congestion or designated network busy hours, dynamically reducing use of the security resources to decontaminate only some of the contaminated assets; and
  upon concluding the traffic congestion or during designated non-busy hours, dynamically increasing use of the security resources to decontaminate any remaining contaminated assets.

11. The method of claim 1 further comprising:
  deactivating the security resources upon determining that the network is decontaminated.

12. The method of claim 1 further comprising, prior to dynamically coordinating the blacklist and the whitelist:
  determining that the network is contaminated; and
  dynamically activating the security resources.

13. The method of claim 1, wherein the anomalous activity includes suspicious data communicated by a contaminated node, wherein the suspicious data is indicative of a virus or malware.

14. The method of claim 1, wherein the blacklist includes a list of contaminated nodes comprising wireless devices and network access nodes.

15. The method of claim 1, wherein monitoring runtime behavior of the network of nodes comprises:
  monitoring a topology of nodes of a 5G wireless network.

16. The method of claim 1 further comprising, prior to using the security resources to decontaminate the contaminated assets:
  instantiating a cleanroom environment to isolate the contaminated assets.

17. A network node comprising:
  a processor; and
  memory containing instructions that, when executed by the processor, cause the network node to:
    identify suspicious activity or data of a topology of network nodes;
    in response to the suspicious activity or data, dynamically coordinate security resources, a blacklist, and a whitelist,
      wherein the blacklist includes a list of access, routing, or mobility functions performed by contaminated assets of the network nodes and an indication of the contaminated assets, including wireless devices with a service subscription with a network provider of the wireless network, of the network of nodes that are contaminated due to the anomalous activity,
      wherein the whitelist includes a list of decontaminated assets of the topology of network nodes,
      wherein a first set of the security resources are allocated to the blacklist and a second set of the security resources are allocated to the whitelist, and wherein the first set and the second set are different depending on a load ratio between the blacklist and the whitelist;

use the security resources to decontaminate the contaminated assets by removing malware or rerouting network traffic to avoid the contaminated asset to thereby produce newly decontaminated assets;

remove the newly decontaminated assets from the list of contaminated assets of the blacklist to thereby produce an adjusted list of contaminated assets;

add the newly decontaminated assets to the list of decontaminated assets of the whitelist to thereby produce an adjusted list of decontaminated assets; and dynamically adjust the security resources depending on a load ratio between the adjusted list of contaminated assets of the blacklist and the adjusted list of decontaminated assets of the whitelist.

18. The network node of claim 17, wherein dynamically adjusting the security resources comprises causing the network node to:

activate or deactivating at least some of the security resources.

19. A non-transitory computer-readable medium with instructions stored thereon that, when executed by a computing system, cause the computing system to perform operations comprising:

detecting an anomalous activity of a network of nodes, the anomalous activity being indicative of contamination of the network of nodes;

dynamically coordinating a security service including a blacklist and a whitelist, wherein the blacklist includes a list of access, routing, or mobility functions performed by contaminated assets of the network nodes and an indication of the contaminated assets, including wireless devices with a service subscription with a network provider of the wireless network, of the network of nodes that are contaminated due to the anomalous activity, wherein the whitelist includes a list of decontaminated assets of the network of nodes, wherein the security service manages a first set of resources that are allocated to the blacklist and a second set of resources that are allocated to the whitelist, and wherein the first set and the second set of the resources are different depending on a load ratio between the blacklist and the whitelist;

using the resources to decontaminate the contaminated assets and thereby produce newly decontaminated assets;

removing the newly decontaminated assets from the blacklist to thereby produce an adjusted blacklist;

adding indications of the newly decontaminated assets to the whitelist to thereby produce an adjusted whitelist; and dynamically adjusting use of the resources according to a load ratio between the adjusted whitelist and the adjusted blacklist.

20. The non-transitory computer-readable medium of claim 19, wherein dynamically adjusting use of the resources comprises:

dynamically reducing use of the resources to decontaminate the contaminated nodes indicated on the blacklist based on a measure of traffic congestion on the network nodes, or dynamically prioritizing some of the contaminated assets of the blacklist for decontaminating.

\* \* \* \* \*